C. A. HARPER.
Lamp Stove.
No. 2,421. Reissued Dec. 18, 1868.
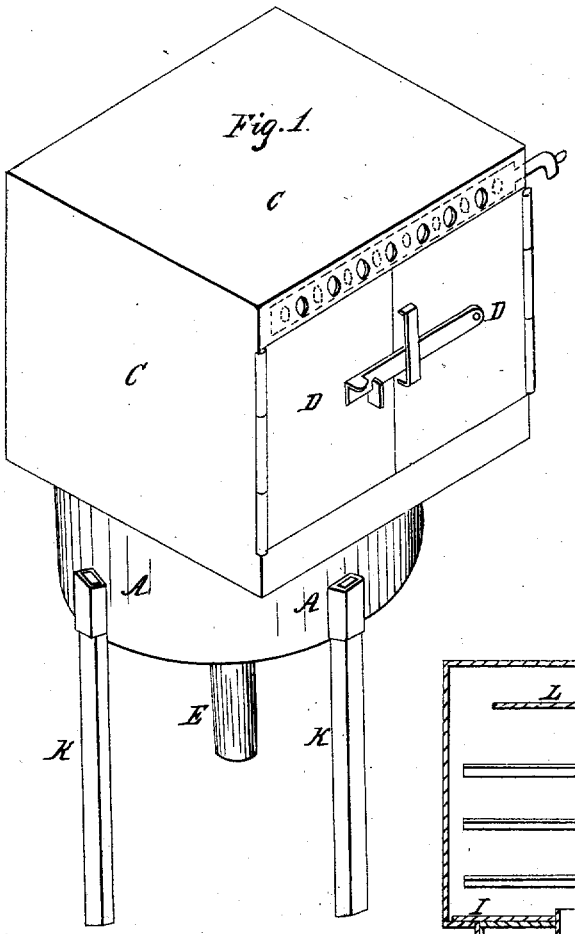
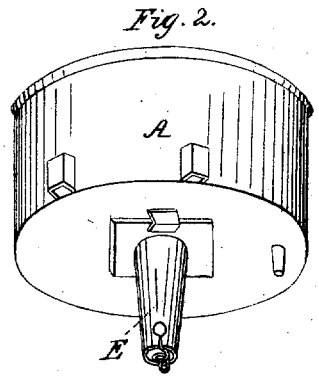
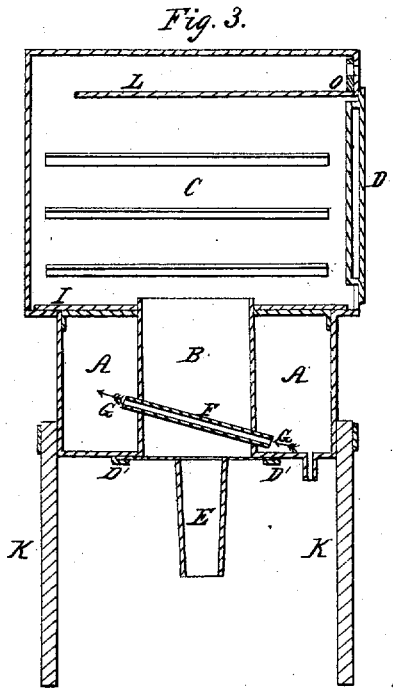
Witnesses:
O Blanchard
Inventor:
C A Harper
D P Holloway Jr
his Attys
N. PETERS, Photo-Lithographer, Washington, D. C.

United States Patent Office.

PORTABLE LAMP COOKING APPARATUS.

C. A. HARPER, OF RAHWAY, NEW JERSEY.

*Letters Patent No.* 54,337, *dated May* 1, 1866; *reissue No.* 2,421, *dated December* 18, 1866.

The Schedule referred to in these Letters Patent and making part of the same.

TO ALL WHOM IT MAY CONCERN:

Be it known that I, C. A. HARPER, formerly of Little Rock, county of Pulaski, and State of Arkansas, now residing at Rahway, in the county of Union, and State of New Jersey, have invented a new and useful improvement in Cooking Apparatus; and I do hereby declare that the following is a full, clear, and exact description of the same, reference being had to the annexed drawings, making part of this specification, in which—

Figure 1 is a perspective view.

Figure 2 is a perspective view of boiler.

Figure 3 is a vertical section.

The same letters in the several figures are employed in indicating identical parts.

The essential features of my improvements are—

1. So constructing a portable cooking apparatus that the heater (whether gas, coal, a lamp, or any other mode of heating it may be applied) shall be suspended below the apparatus by cleats on the same, in such a manner that it may be removed when desired, without disturbing the other parts of the apparatus.

2. In constructing the boiler with a pipe passing through the centre vertically, through which the heat passes to the other parts of the apparatus, and across which is placed a tube filled with water, which being exposed to an intense heat causes a circulation to be established, with a more rapid heating of the water in the body of the boiler.

3. In so arranging the apparatus that the boiler shall be located below the oven, and the heat shall pass through the boiler directly into the oven.

4. In so arranging the parts composing the apparatus that the oven and boiler can be used separately or together; and in the latter case, that articles may be introduced into or taken out of the boiler through the doors of the oven.

5. In an improved construction of the oven, by which a more perfect ventilation is effected.

E, in the drawings, represents a heater of any kind, whether constructed to use gas, coal, wood, or any other fuel. This heater, the form of which is varied according to circumstances, has on its upper extremity projecting flanges, which slide into cleats, D′, on the under surface of a plate sustained upon legs, K. This plate, in the case presented, is the bottom of the boiler. It may be, however, an independent plate, upon which the boiler stands. The peculiarity of construction does not turn on the form of this plate, but on the suspension of the heater below the cooking apparatus, upon cleats or other slides, permitting the heater to be withdrawn at pleasure. A is the boiler, which may be of any convenient external form. It has through the centre an opening, B, through which the heat generated in the heater rises, passing out above into the oven or the open air. Across this opening or pipe a tube or tubes, F, pass, both ends opening into the boiler at G G. This tube being filled with water and containing but a small quantity of the same, and presenting a considerable fire surface in proportion to the amount of water contained, the water will be rapidly heated, and rising will mingle with the water in the boiler, to which its heat will be communicated, and its place be continually supplied by the cooler water flowing in from the body of the boiler. The lid of the boiler may be constructed to turn upon hinges, so as to give admission to the interior of the same, or in any other convenient form. C is the oven, which is constructed with double doors, D D. The doors and sides of this oven should be made with an internal air-chamber for greater economy of heat; it is internally arranged with the usual slides and in the usual manner. The bottom of the oven is formed by the independent plate, I K′, which forms a cover also over the boiler. This plate has an opening corresponding with that in the body of the boiler, through which the heat passes into the oven, and it may be removed to give access to the boiler. Near the top of the oven is a flue-sheet, L, extending nearly to the back of the oven, around which the draught passes before escaping through the damper, O, by which its amount is regulated, which damper is intended to be in two parts, so that one end may be opened and the other closed.

In constructing my portable cooking apparatus I so proportion the parts that all the other parts may be packed inside the oven.

What I claim as my invention, and desire to secure by Letters Patent, is—

1. The heater E, when attached to the bottom of the boiler or its supporting plate, by cleats, on which it may be moved without disturbing the other parts of the apparatus, as and for the purpose set forth.

2. The boiler A, of a cooking stove, when constructed with a central vertical pipe, B, opening through it, and also with transverse pipes, F, across the same, as and for the purpose set forth.

3. A cooking apparatus when so constructed that there shall be a direct communication from the heater through the boiler into the chamber of the oven, without the interposition of bottom plates to the latter.

4. So arranging the boiler and oven that access may be had to the interior of the boiler through the doors of the oven, substantially as set forth.

5. The oven C, when so constructed that the heated air is introduced directly into the body of the oven, and its exit is controlled by the flue-sheet L and damper O, arranged substantially as set forth.

In testimony whereof I have signed my name to this specification before two subscribing witnesses.

C. A. HARPER.

Witnesses:

B. L. Corss,

Albert E. Brown.